Feb. 4, 1969

J. W. SCOTT, JR 3,425,810

HYDROTREATING APPARATUS

Filed May 3, 1965

Sheet _1_ of 2

INVENTOR
JOHN W. SCOTT, JR.
BY
ATTORNEYS

INVENTOR
JOHN W. SCOTT, JR.
ATTORNEYS

United States Patent Office 3,425,810
Patented Feb. 4, 1969

3,425,810
HYDROTREATING APPARATUS
John W. Scott, Jr., Ross, Calif., assignor to Chevron Research Company, San Francisco, Calif., a corporation of Delaware
Filed May 3, 1965, Ser. No. 452,569
U.S. Cl. 23—289          5 Claims
Int. Cl. B01j 9/02

ABSTRACT OF THE DISCLOSURE

A multibed reactor for hydrotreating heavy oils is provided with an inlet for upflow hydrogen and with multiple oil inlets and outlets to better control temperature in the reactor. An outlet for vapors formed in the reactor is preferably located below the top two beds. Preferably the reactor is provided with a liner to support the catalyst and provide an annular space separating the catalyst beds from the reactor shell.

---

This invention relates to methods and means for contacting reacting liquids and gases at reaction conditions. More particularly, the invention relates to apparatus in the nature of reactors for contacting liquid hydrocarbon oils with hydrogen-rich gas and solid particles such as catalysts at elevated temperature and pressure, and methods for using such apparatus for carrying out the contacting. Still more particularly, the invention relates to novel methods and means for hydrotreating residual oils comprising the highest boiling portions of crude petroleum and similar materials.

In hydrotreating heavy hydrocarbonaceous oils such as residuals, special problems arise because large amounts of heat released in the reaction of hydrogen with constituents of the oil may cause excessively high temperatures at localized areas in the reactor, damaging the reactor or the catalyst, if one is used, or causing unfavorable reactions. Also, vaporization accompanying the conversion of heavy liquid residuals to lower boiling materials may cause excessive vapor flow rates, high pressure drop, and entrainment of liquid in the vapor. Also, the highest boiling portions of the liquid oil frequently need more severe treatment than lower boiling portions, but the lower boiling portions, including vaporizable hydrocarbons, require at least some treatment.

For example, hydrocarbon oils are typically hydrotreated by passing the oil and hydrogen together downward through a reactor containing a catalyst as one or more fixed beds of small particles. If the feed contains heavy residual materials, a long contact time is needed to accomplish substantial upgrading of the oil. To provide the long contact time, large diameter or "fat" reactors may be used, but such results in poor liquid distribution across the reactor diameter and throughout the catalyst. Another approach has been to use extremely tall reactors, but temperature control then becomes more difficult and the pressure drop through the reactor is greater. In either case, the reactors are difficult to fabricate because of their extreme size, especially for use at high pressures. Instead of using an extremely tall reactor, multiple serially connected reactors may be provided to avoid the liquid distribution problem, but problems then arise in transferring the material from one reactor to the next due to the tendency for the phases to separate into slugs of liquid and gas. In some cases it becomes necessary to cool down the effluent of a first reactor, separate oil and gas, effect purification to remove some of the lighter products, and then pass the separately reheated materials to the next reactor. Apparatus of the present invention is designed to avoid many of the above problems and to provide additional new advantages and improved methods of carrying out hydrotreating of residual oils.

The present invention provides apparatus in the nature of a reactor for carrying out hydrotreating of heavy hydrocarbonaceous oils, comprising an erect vessel having a top end and a bottom end and adapted to contain hydrogen and liquid oil at elevated temperature and pressure. The vessel is provided with interval perforate support means for supporting solid contact particles within the vessel when in an erect position and defining at least three chambers for solid contact particles so arranged and constructed that fluid flowing from one end of the vessel to the other end would be constrained to pass serially through said chambers. The vessel is further provided with inlet means for introducing hydrogen-rich gas at a point within the vessel below at least the top two beds, outlet means for withdrawing vapor from a point within the vessel above a point for introducing hydrogen-rich gas, first inlet means for introducing liquid hydrocarbon oil at a point within the vessel above at least the bottom two beds, second inlet means for introducing liquid oil at a point within the vessel below the point for introducing liquid by said first inlet means, outlet means for withdrawing liquid from a point within the vessel below a point for introducing hydrogen-rich gas, and separate outlet means for withdrawing liquid from a point within the vessel above a point for introducing hydrogen-rich gas.

In the attached drawings, FIGURE 1 illustrates in part section a typical embodiment of the apparatus, including some details of suitable structure shown schematically;

Figure 1:
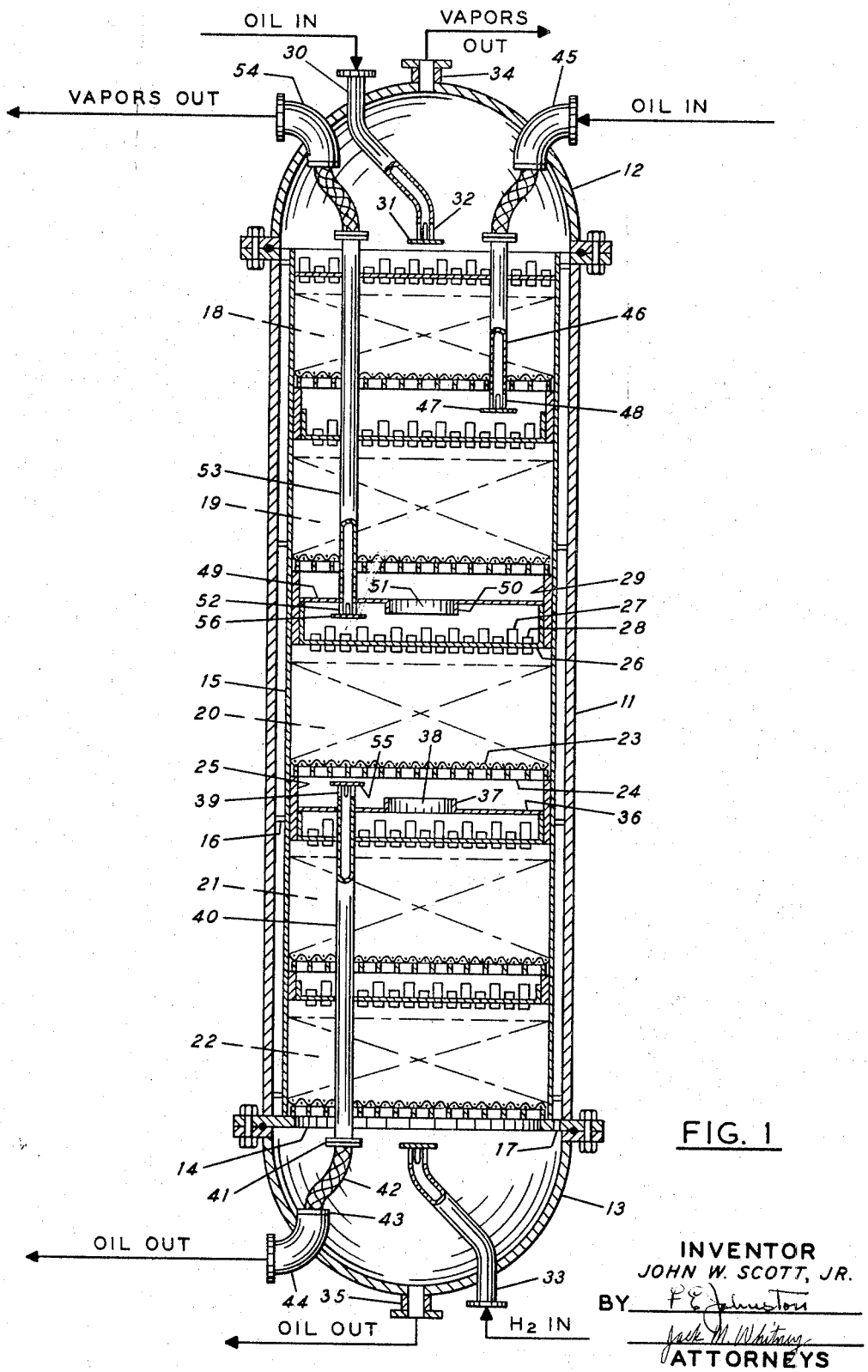

Referring now to FIGURE 1, there is shown a reaction vessel formed by an outer cylindrical shell or tube 11 fitted with a top head 12 and a bottom head 13, thereby forming a closed vessel. The walls are made sufficiently strong and of suitable materials such as steel alloys to resist deformation and corrosion at elevated temperatures above 500° F. and elevated pressures above 1000 p.s.i.g. typically used in hydrotreating, in the presence of hydrogen and by-product contaminants formed in the reactions. At the bottom end of shell 11 is an annular ring or shelf 14 for supporting an internal cylindrical shell or tube 15. Shell 11 and shell 15 are separated by spacers such as shown at 16, thereby defining an annular space between shells, which annular space is open at the top and closed at the bottom by shelf 14 except for openings such as provided at 17. Within shell 15 are beds of catalyst particles in separate chambers 18, 19, 20, 21, and 22 separated by internal perforate support means such as screens, illustrated in the case of bed 20 by screen 23. The screen in turn is supported on a grid or bars shown by 24, resting on or attached to annular support ring 25, which is attached to shell 15. Above each catalyst bed there may be provided vapor-liquid distributing means, as shown above bed 20 by plate 26, which has short tubular risers 28 and tall tubular risers 27 extending through it. Plate 26 rests on or is attached to annular support ring 29, attached to shell 15. Similar construction may be used above and below each bed of catalyst to thereby define the catalyst chambers, as illustrated. Downflowing liquid is evenly distributed across the vessel diameter by the short risers 28, through which liquid overflows, while upflowing vapor is evenly distributed across the reactor diameter by the tall risers 27, which extend above the normal liquid level on each plate such as 26.

The construction is such that oil introduced at the top to flow directly to the bottom is constrained to pass serially through the chambers and catalyst beds. Similarly, hydrogen introduced at the bottom to flow out the top will pass serially through each chamber and catalyst bed. As an exception to the foregoing statement a small, and relatively minor, portion of hydrogen may flow through holes 17 in shelf 14 and flow up through the annular space between shells 11 and 15 as a purge gas and/or coolant for the outer shell. Or, holes 17 may act as weep holes to drain out any oil or condensate collecting between the shells. Also, as further described herein, a portion of downflowing liquid may be removed before reaching the bottom, and a portion of upflowing vapor may be removed before reaching the top.

As means for introducing liquid oil at a point within the vessel there is provided a pipe 30 extending through top head 12. Oil flowing in a conduit connected to pipe 30 can enter the vessel above bed 18, but is prevented from impinging directly on the top bed or tray by solid baffle or plate 31, instead flowing out through slots 32 at the lower end of pipe 30 for better distribution. Similarly, extending through bottom head 13 there is provided pipe 33 to which may be connected a conduit supplying hydrogen-rich gas for introduction into the vessel below bed 22. As shown, the construction of pipe 33 may be substantially as used for pipe 30. As means for withdrawing vapors from the top of the vessel there is provided in top head 12 a flanged opening or boss 34 to which may be connected a conduit for vapors. In like manner, flanged opening or boss 35 is provided in bottom head 13 for withdrawing liquid oil from the bottom of the vessel at a point below the point for introducing hydrogen-rich gas. Means are also provided for withdrawing liquid from a point within the vessel above the point for introducing hydrogen-rich gas, as for instance by tray 36, which has an upwardly extending annular lip or baffle 37, defining an opening 38 for upflowing vapor and for downflowing liquid which overflows baffle 37. Liquid collecting on tray 36 can flow into pipe 40 through slots 39 in the portion of pipe 40 which extends above tray 36. At its lower end pipe 40 is coupled at 41 to flexible pipe connection 42, which in turn is coupled at 43 to pipe 44 extending through bottom head 13. The flexible connection may be a tube formed of braided metal or otherwise constructed, as by swivel joints, to permit and compensate for thermal expansion of the reactor internals relative to the external shell and bottom head.

Means may also be provided for withdrawing upflowing vapors from a point within the reaction vessel below a point for introducing liquid oil. Thus, above catalyst bed 20 there is provided tray 49 which has a downwardly extending annular lip or baffle 50 defining an opening 51 for downflowing liquid and upflowing vapor. Vapor trapped in the doughnut-shaped space defined by tray 49 and baffle 50 may flow through slots 52 in the downwardly extending end of pipe 53. As shown, pipe 53 is connected, by means similar to those used in the case of pipes 40 and 44, to pipe 54 extending through upper head 12.

The conduit defined by pipe 44, tube 42, and pipe 40 may be used as means for introducing oil, or as means for introducing hydrogen, or as means for introducing a mixture of oil and hydrogen. In these cases, solid plate or baffle 55 is provided to close the upper end of pipe 40 and prevent direct impingement of entering material on the bottom of screen 23. In like manner, oil, or hydrogen, or a mixture of oil and hydrogen may be introduced through pipe 54 into the vessel via pipe 53, in which cases again a solid plate or baffle 56 is provided to close the lower end of pipe 53 and prevent direct impingement on plate 26 and the risers 27 and 28 thereon.

The operation of the embodiment of apparatus shown in FIGURE 1 will now be described with reference to a method of using it as a reactor for residuum hydrocracking. Preheated petroleum residuum is introduced into the reactor through pipe 30 at a point above the top catalyst bed 18. Hydrogen-rich gas is introduced into the reactor at a point below bottom catalyst bed 22 through pipe 33, similarly preheated. Hydrogen-rich gas flows upwards through catalyst beds 22, 21, 20, 19, and 18, ultimately being withdrawn through outlet 34 at the top of the reactor, carrying with it vaporized hydrocarbons contained in the feed and produced by hydrocracking of the feed. The oil introduced through pipe 30 flows downward countercurrent to the vapors through catalyst beds 18, 19, and 20, and at least a portion thereof continuous downward through beds 21 and 22, ultimately collecting as a pool of liquid in the bottom head 13 and being withdrawn through bottom outlet 35. Downflowing liquid is collected and distributed on the plates between reactor beds as exemplified by plate 26 between beds 19 and 20. The liquid level builds up above the top of short risers 28 so that liquid flows downward uniformly through the short risers. The upflowing hydrogen is distributed uniformly across the reactor cross section by being constrained to flow upward through the tall risers 27. The level of liquid on the plate may build up to or slightly above the top of the tall risers, but the vapors may nevertheless flow upwards therethrough. Between beds 20 and 21 a portion of the downflowing liquid is trapped on tray 36 and withdrawn through pipe 44 via pipe 40, entering pipe 40 through the slots 39. The slots extend above the upper lip of baffle 37 and do not extend all the way down to the level of tray 36, so that a level of liquid is maintained to insure that a portion of the oil always overflows baffle 37 to the lower catalyst beds. Similarly, between beds 20 and 19 a portion of the upflowing vapor is trapped below tray 49 and is withdrawn through pipe 54 via pipe 53. Another portion of the vapors must necessarily continue upwards through opening 51 and thence through catalyst beds 19 and 18. All or a portion of the oil withdrawn through pipe 44, desirably after cooling, is returned to the reactor through pipe 45 and pipe 46 at a point within the reactor below the point of introducing fresh residuum feed.

Typical conditions maintained within the reactor are temperatures of 750–900° F. and pressures of 2000–4000 p.s.i.g., flow rate of fresh residuum feed relative to catalyst volume of 0.2–1 LHSV, and flow rate of hydrogen-rich gas relative to fresh residuum feed of 2000–10,000 s.c.f./bbl. A the conditions employed a portion of the residuum feed is rapidly hydrocracked and vaporized in catalyst bed 18, the vaporized portion being carried out with upflowing vapors leaving the top. The reactions are exothermic such that a substantial and undesirably high temperature rise could occur in bed 18. The cooler oil introduced between beds 18 and 19 adjusts the temperature downward to more desirable levels. The unconverted fresh feed and recycle oil are further hydrocracked to vaporized products while flowing downward through catalyst beds 19 and 20. The portion which continues downward through beds 21 and 22 thus comprises only the high boiling unconverted residual components, and this portion is subjected to very vigorous stripping action by the hydrogen supplied at the bottom in a much greater hydrogen to oil ratio than exists in the upper catalyst beds. It is found that additional vaporizable hydrocracked products can be stripped out of the downflowing oil in this way even if a lower temperature is used in the bottom beds, and this lower temperature and high hydrogen pressure permits hydrogenation of refractory aromatic species which would otherwise be difficult to convert. The process is desirably operated so that only a small amount of oil relative to the fresh feed is ultimately withdrawn from the bottom through 35. The oil withdrawn via pipe 40 through pipe 44 and recycled through pipes 45 and 46 is thus recycled nearly to extinction as it must ultimately leave as vapors through the top or as oil out the bottom. The withdrawal of vapors through pipes 53 and 54 is provided because of the high degree of vaporization occurring in beds 22, 21, and especially bed 20. If all of the vapors were required to pass upward through all beds, the pressure drop would be inordinately high, and disruption and attrition of the catalyst would occur, or liquid would be pushed upward by the ascending vapors and carried overhead by entrainment in the vapor stream.

To more specifically illustrate how the method of contacting used influences hydrocracking of heavy oils, a deasphalted residual oil was introduced at the top of a reactor containing 8-14 mesh particles of nickel sulfide-molybdenum sulfide-alumina catalyst, and hydrogen was introduced at the bottom. The oil feed had a gravity of 16.5° API, a Ramsbottom Carbon of 2.35 weight percent, a viscosity of 273 SSU at 210° F.; contained 0.95 weight percent sulfur, 0.15 weight percent nitrogen, and 12 p.p.m. of nickel, vanadium and iron; and boiled 45% between 640° F. and 1010° F. and 55% above 1010° F. In experiments at 2000 p.s.i.g., average-catalyst temperature was varied from 800° F. to 825° F., hydrogen rate was varied from 5,000 to 15,000 s.c.f./bbl., and total feed rate (including recycle) was varied from 0.5 to 0.75 LHSV. Vaporized oil included in the vapors recovered overhead had end boiling points between 900 and 950° F. at these conditions. At 820° F. and gas rate of 15,000 s.c.f./bbl. the oil was essentially completely hydrocracked and carried overhead in the vapors. At 820° F. and a gas rate of 10,000 s.c.f./bbl. only 40% of the oil entering was carried overhead, the total liquid oil input rate being maintained the same (0.75 LHSV) by withdrawing unconverted oil from near the bottom and reintroducing it near the top. At 800° F. and a gas rate of 15,000 s.c.f./bbl. only 35% of the oil entering was carried overhead. The distillate products obtained at 100% per pass conversion were of lower quality, having higher nitrogen content and lower diesel index than the products at 35% and 40% per pass conversion, apparently because at high conversion, products were vaporized and withdrawn before contacting the catalyst long enough for purification. Superior products were obtained at a lower total oil input rate of 0.5 LHSV, higher temperature of 825° F., and lower gas rate of 5,000 s.c.f./bbl., such conditions giving 50% per pass conversion.

From these results it is concluded that to obtain good quality products there must be provided adequate contact time of liquid oil with the catalyst, and the use of high temperatures and high gas rates will decrease liquid contact time by causing rapid conversion to distillates and rapid vaporization. Where the oil and hydrogen flow in opposite directions the effects of temperature and gas rate can be self-reinforcing to give a greatly magnified cumulative effect, because the higher rate of conversion at higher temperature increases the vapor flow rate, and the decreased amount of liquid remaining is contacted with gas in a greater ratio per barrel of liquid remaining, thereby further increasing vaporization and conversion. If control is not precise, the results will be unpredictably erratic. If low temperature and low gas rate must be used to obtain long liquid contact time so as to sufficiently upgrade the product oil, the reactor will have to be larger and a major advantage of countercurrent reaction may be lost. This advantage is that it has been found that conventional reactors, employing concurrent flow of hydrogen and oil together downward through the catalyst beds, must be made three times as large to accomplish the desired nearly complete conversion of deasphalted residual to distillates, or else must use a temperature 50° F. higher, causing too rapid catalyst fouling, as compared to a reactor with countercurrent flow.

In a reactor constructed in accordance with the principles outlined herein, for example as in FIGURE 1, the advantages of this particular type of countercurrent contacting can be obtained while avoiding the disadvantages and problems. Thus, the fresh feed may be contacted first at a relatively low temperature with a relatively low ratio of gas to oil in the top catalyst bed or beds, for good purification. Recycled oil may then enter at a temperature providing a controlled somewhat higher temperature in the next lower catalyst bed or beds and a somewhat lower ratio of gas to oil (in view of the increased amount of oil present), to further purify the liquid oils. At a lower point a portion of upflowing vapor may be removed, it necessarily following that in the bed or beds below that point there must be a significantly higher ratio of gas to liquid oil, causing greater conversion and vaporization. At a still lower point a portion of the remaining downflowing liquid may be withdrawn, whereby in the bed or beds below that point there will be a much higher ratio of gas to oil, causing complete or nearly-complete conversion and vaporization, but only after the oil has been substantially purified and upgraded in the liquid phase in the upper beds. The liquid reaching the bottom for withdrawal there will thus include only the heaviest and most unreactive components of the feed. Ordinarily it is desirable to maintain some liquid flow all the way through the reactor to insure that conversion does not proceed so far that the unvaporizable components precipitate or solidify in the bottom catalyst bed. Thus a lower temperature may be used in the bottom bed, obtained by control of the temperature of the hydrogen introduced at the bottom. After recovering the distillate produced from the withdrawn vapor stream, as by condensing and separating from uncondensable hydrogen-rich gas, the hydrogen-rich gas will ordinarily be reused as by recycling it with added fresh hydrogen.

Figure 2:
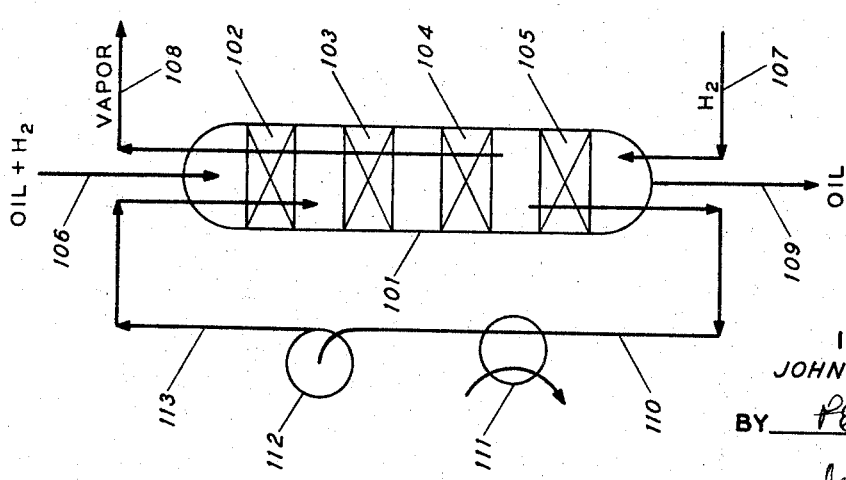
FIGURE 2 illustrates schematically another embodiment wherein oil and hydrogen can be passed downflow with a separation near the bottom between liquid and vapor.

Referring now to FIGURE 2, reactor 101 shown schematically contains catalyst beds 102, 103, 104, and 105 and is provided with outlet means for withdrawing vapor shown by line 108, so constructed and arranged that hydrogen-rich gas can be withdrawn from a point within the reactor below the top two beds, which provides the only vapor outlet. One inlet means for introducing liquid hydrocarbon oil is so constructed and arranged that a mixture of liquid oil and hydrogen-rich gas can be introduced at a point within the reactor, as by line 106. As in FIGURE 1, means are provided for introducing hydrogen-rich gas below all catalyst beds as by line 107, and means are provided for withdrawing liquid oil from the reactor at a point below the point of introducing hydrogen-rich gas, as by line 109. Separate means are provided for withdrawing liquid from a point within the reactor above bed 105 as by line 110. Line 113 represents second inlet means for introducing liquid oil at a point within the vessel below bed 102 and below the point for introducing the mixture of oil and hydrogen.

The apparatus of FIGURE 2 may be used similarly as the apparatus of FIGURE 1 for hydrocracking residual oils, including the use of recycled oil for controlling a hot spot temperature by passing the oil in line 110 through cooler 111 and then reintroducing it by means of pump 112 through line 113. In FIGURE 2, however, instead of the contacting between oil and hydrogen being entirely countercurrent, the oil and hydrogen introduced at the top flow concurrently downward together until a separation is made between beds 104 and 105. The portion of liquid which continues to flow downward through bed 105 is vigorously stripped by the additional hydrogen introduced via line 107. All of the vapors must leave via line 108 from between beds 104 and 105. This arrangement is particularly advantageous as permitting the use of high ratios of hydrogen to oil and complete vaporization by conversion of the oil, without the contacting problems encountered in a countercurrent system.

The apparatus of FIGURE 2 may also be used to even greater advantage in hydrofining of distillate gas oils at lower temperatures where it is not desired to vaporize any more of the oil than represents the production of light distillates. The stripping provided in bed 105 is used primarily to remove dissolved light distillates and undesirable by-products such as $NH_3$ and $H_2S$ from the liquid gas oil recovered in line 109. This oil can then be passed directly to further processing units such as a catalytic hydrocracker employing a catalyst which would be poisoned by the presence of organic nitrogen compounds or $NH_3$.

Figure 3:
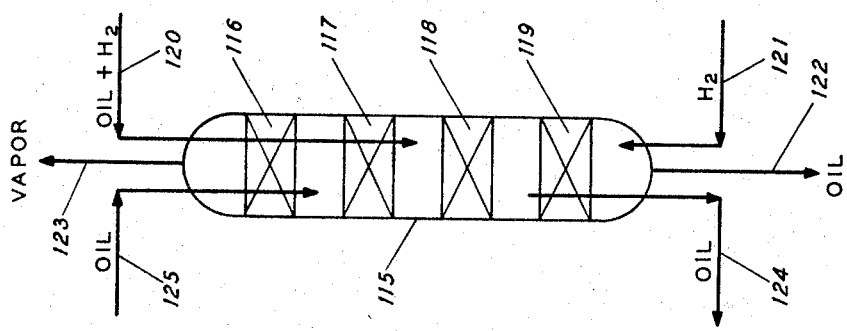
FIGURE 3 illustrates schematically another embodiment wherein oil and hydrogen can be introduced near the midpoint of a reactor for split flow of vapor upward and oil downward.

Referring now to FIGURE 3, there shown is an embodiment of the apparatus wherein reactor 115 contains catalyst beds 116, 117, 118, and 119, and one of the inlet means for introducing liquid hydrocarbon oil is so constructed and arranged that a mixture of liquid oil and hydrogen-rich gas can be introduced at a point within the reactor below the top two beds, as by line 120. As in the previous embodiments, hydrogen-rich gas is introduced below the bottom bed 119 via line 121, and liquid hydrocarbon oil is withdrawn from the bottom of the vessel via line 122. Line 124 provides further means for withdrawing liquid hydrocarbon oil from a point within the reactor above bed 119, and line 125 provides means for introducing another portion of liquid oil at a point within the reactor below bed 116. Vapors can be withdrawn from the top of the reactor through line 123.

This embodiment is particularly useful for treating hydrocarbon oils boiling over a broad boiling range such that the oil to be treated includes both vaporizable and unvaporizable constituents. The vaporizable constituents of the oil introduced via line 120 flow upward as vapor with the hydrogen-rich gas through beds 117 and 116 and are thereby treated in the vapor phase and later recovered from the vapor in line 123. The unvaporizable portion of the oil in line 120 flows downward through beds 118 and at least a portion thereof continues through bed 119 and is withdrawn from the bottom through line 122, being thus countercurrently treated with upflowing hydrogen. The oil introduced via line 25 may be another oil desired to be purified or may be a recycled, cooled, portion of the oil from line 124. This oil thus serves to control the hot spot temperature which would otherwise occur in one or both beds 117 and 118.

Figure 4:
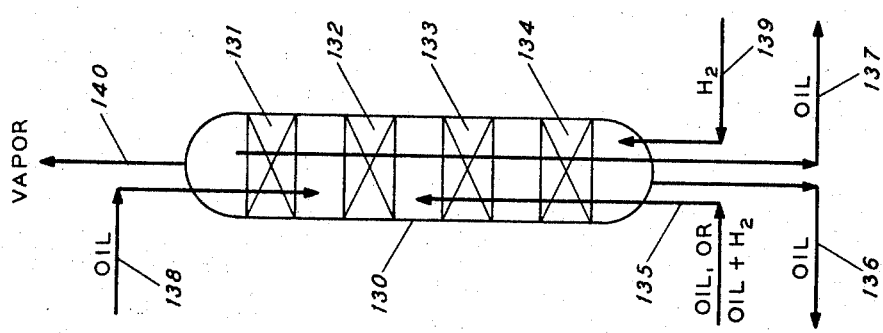
FIGURE 4 illustrates schematically another embodiment wherein hydrogen-rich gas flows upward with part of the oil and a separation between liquid and oil is effected near the top.

Referring now to FIGURE 4, there shown is an embodiment wherein reactor 130 containing catalyst beds 131, 132, 133, and 134 is provided with means for withdrawing liquid oil from a point above any point for introducing hydrogen-rich gas, as by line 137 for withdrawing oil from above bed 131, and the first and second inlet means provided for introducing liquid oil, as by line 138 terminating below bed 131, and as by line 135 terminating above bed 133, are so arranged and constructed as to introduce liquid oil below the point from which line 137 withdraws liquid oil. As required in all cases, line 136 is provided to withdraw liquid oil from a point below the point of introducing hydrogen-rich gas as by line 139, and means are provided for withdrawing vapor from the top through line 140.

In this embodiment the reactor is operated essentially flooded with liquid oil. A portion of the oil introduced via line 135 flows downward through beds 133 and 134 countercurrent to upflowing hydrogen, and any unvaporized portion thereof is withdrawn through line 136. Another portion of the oil introduced through line 135 may flow upward through beds 132 and 131, and any unvaporized portion thereof is withdrawn through line 137. The oil introduced via line 138 in a particularly advantageous method of using the apparatus is cold, so that the oil flowing upward through bed 131 is cooled and absorbs some of the vaporized distillates from the upflowing hydrogen. The oil can thus be recovered from the reactor via line 137 at a substantially lower temperature than prevails in the major body of the reaction zone represented by beds 132, 133, and 134. In this particular embodiment, the oil in line 138 may be all or a portion of the oil withdrawn via line 136, so that substantially the net liquid product is recovered in line 137. This provides a particularly suitable method of treating heavy residual oils which may contain entrained solid particulate matter, provided only that the entrained solid particles are sufficiently finely divided so as not to too rapidly plug up the catalyst beds. By maintaining the reactor substantially flooded with liquid flowing rapidly the finely divided particles can be kept in suspension and prevented from causing plugging, being ultimately removed from the oil in line 137 by settling, filtration, or other suitable means. The upward liquid flow rate may be rapid enough to expand the catalyst beds and cause the particles to move about or ebullate.

In another method of operation in the embodiment of FIGURE 4 the flow rates may be adjusted so that all of the oil introduced via line 135 flows downward through beds 133 and 134. A portion of the oil introduced by line 138 also flows downward through bed 132, the remainder thereof flowing upwards through bed 131 and being withdrawn via line 137. Instead of being cooled, the oil in line 138 may be heated to a higher temperature so as to insure completion of conversion in bed 131. The embodiment is thus particularly useful for hydrotreating with a relatively low ratio of hydrogen to oil, as compared to the embodiment of FIGURE 2 which is more useful for hydrotreating with a relatively high ratio of hydrogen to oil. As indicated, in FIGURE 4, a mixture of oil and hydrogen may be introduced through line 35, the hydrogen serving, for example, to replace that consumed in hydrogenation reactions in beds 134 and 133 to thereby maintain a more uniform $H_2$ flow rate through the entire reactor.

It will be appreciated that, in all of the embodiments illustrated, the operation may be controlled by regulating the flow rates of various streams. For example, the flow rates of inlet streams are adjusted by regulating the throughput of compressors and pumps supplying the incoming materials in accordance with methods well known. The rates of withdrawing various streams may be regulated by suitable valving in the conduits for carrying away such streams, with appropriate automatic control provisions as can readily be devised in accordance with known methods.

It will further be appreciated that a single reactor constructed in accordance with the present invention may be provided with multiple means for introducing hydrogen-rich gas and liquid oil and with multiple means for withdrawing vapors and liquid oil representing various combinations of the embodiments illustrated in FIGURES 1 through 4. All of the means provided in apparatus constructed in accordance with the invention need not be utilized in each method of using the apparatus to carry out a particular conversion of a particular feed, and a single means utilized for introducing material in one particular method of operation may be utilized for withdrawing material in another method of operation for a different purpose.

The illustrated construction of FIGURE 1, with an internal shell supporting the catalyst chambers within an external shell, is convenient for facilitating fabrication, catalyst loading, and assembly. Thus, the catalyst particles may be loaded into the various chambers through portholes in the side of the inner shell while it is outside of the outer shell, said portholes being subsequently closed up. The loaded inner shell may then be lowered into the outer shell, and the internal piping is connected by means of the flexible couplings prior to attaching the top and bottom heads. Separate means may be provided for passing cool gas through the annular space between shells, as the outer shell need not be made so massive if it can be protected from the high temperatures encountered in the catalyst beds.

It is equally suitable, however, within the scope of the present invention, to employ a reactor having but a single stronger, shell from which the supporting screens are hung or otherwise attached, and to provide means for loading all catalyst chambers by gravitating through special conduits from the top bed downwards. Also, means may be provided for unloading the catalyst by draining through the bottom with special provisions for dumping from upper chambers to successively lower catalyst chambers.

In any construction means will generally be provided for determining the temperature at various points within the reactor, preferably at least one point in each catalyst bed, as may be done by means of a thermowell extending from the top head downward through the beds or from the bottom head upwards through the beds with thermocouples terminating at suitable points within the reactor. Also, means will generally be provided for determining liquid levels at points within the reactor, especially in the bottom head. These and other details such as means for eliminating mist entrainment in withdrawn vapors have been omitted from the drawing because their construction and operation are well known in the art, and to show such details would tend to make the drawing so complicated as to obscure the essential features of the invention.

The contact particles contained within the several chambers may be relatively inert materials which are provided primarily for the purpose of distributing the liquid oil into intimate contact with the gas. Thus, the reactor may be employed for thermal hydrotreating of heavy carbonaceous oils unpromoted by a catalyst, or for stripping heavy liquids with gas. Preferably, however, the solid contact particles are catalytically active for promoting reaction of hydrogen with constituents of the oil. Also, it is advantageous that the particles be of a size and density such that there is substantial space between particles whereby fluid can flow upwards through the beds without substantially disrupting the particles. Accordingly, the catalytically active particles may be provided as in the form of Raschig rings or Berl saddles, particularly in embodiments where the oil is to be contacted countercurrently with the hydrogen.

In general, the apparatus is useful for contacting liquids with gases, but especially for contacting liquid oils with hydrogen in the presence of catalysts promoting hydrogenation. Conditions used in such hydrogenation reactions include temperatures of from 400° to 1000° F., pressures of from a few hundred pounds gauge to several thousand pounds, e.g., 500–10,000 p.s.i.g., oil flow rates of 0.1–15 LHSV relative to the catalyst, and gas flow rates of from a few hundred to 20,000 or more standard cubic feet per barrel of oil. The oil treated, however, must be one which remains at least partially in the liquid phase at the conditions employed. The catalyst is suitably selected depending on the type of reaction desired to be promoted, and different catalysts may be used in different chambers. In the described embodiments herein of hydrotreating heavy and residual oils to remove contaminants such as organic compounds of sulfur, nitrogen, and metals and to produce lower boiling distillate oils, the catalyst comprises one or more Group VI metals, oxides or sulfides, such as molybdenum or tungsten, preferably together with one or more Group VIII metals, oxides or sulfides, such as nickel or platinum, in the form of porous particles, which porosity can be provided by the catalytically active metals being associated with refractory oxide gel-forming substances referred to as carriers or supports, such as alumina, silica, magnesia, and various combinations of these supports and with other inorganic oxides known as useful catalyst ingredients, such as zirconia, titania, boria, etc.

I claim:
1. Apparatus for carrying out hydro-treating of heavy carbonaceous oils, comprising an erect vessel having a top end and a bottom end and adapted to contain hydrogen and liquid oil at elevated temperature and pressure, said vessel having:
    internal perforate support means for supporting solid contact particles within said vessel when in an erect position and defining at least three chambers for solid contact particles adapted so that fluid flowing from one end of said vessel to the other end would be constrained to pass serially through said chambers;
    an internal shell for supporting said support means, said internal shell being tubular in form and, together with said vessel, defining an annular space between said vessel and said internal shell;
    solid contact particles supported by said support means as separate beds in said chambers thus forming a top bed and at least two lower beds;
    inlet means for introducing hydrogen-rich gas at a point within said vessel below at least the top two beds;
    outlet means for withdrawing vapor from a point within said vessel above a point for introducing hydrogen-rich gas;
    first inlet means for introducing liquid hydrocarbon oil at a point within said vessel above at least the bottom two beds;
    means for uniformly distributing liquid above the top bed of contact particles;
    means for uniformly distributing liquid above at least one of the beds of contact particles below the top bed;
    second inlet means extending from one of the two ends of said vessel completely through at least one of said beds for introducing liquid oil at a point within said vessel below the point for introducing liquid by said first inlet means;
    outlet means for withdrawing liquid from a point within said vessel below a point for introducing hydrogen-rich gas;
    and separate outlet means for withdrawing liquid from a point within said vessel above a point for introducing hydrogen-rich gas.

2. Apparatus as in claim 1 wherein outlet means for withdrawing vapor is located so that vapors can be withdrawn from said vessel between the second and third beds.

3. Apparatus as in claim 1 in combination with means for exchanging heat indirectly with liquid withdrawn from said vessel through one of said outlet means and for returning the heat-exchanged liquid to said vessel through one of said inlet means.

4. Apparatus as in claim 1 in combination with means for passing cool gas through said annular space between said vessel and said internal shell.

5. Apparatus as in claim 1 wherein:
    (a) said first inlet means is located so as to allow introduction of oil only above the top bed;
    (b) said second inlet means is located so as to allow introduction of oil only between the top bed and the second bed;
    (c) said outlet means for withdrawing vapor is located so that vapor can be withdrawn from between said second bed and said third bed and is comprised of conduit means extending from said top end of said vessel through said first and said second beds.

References Cited
UNITED STATES PATENTS 2,707,163    4/1955    Thibaut _____ 23—288 XR
3,235,344    2/1966    Dreyer et al. _____ 23—289

JAMES H. TAYMAN, JR., *Primary Examiner.*

U.S. Cl. X.R.

208—47, 89, 109, 146, 210, 216, 217, 251, 254; 220—3; 261—94, 113; 23—283, 288